(No Model.)
G. J. DE CORDOVA & P. A. ISAACS.
VEHICLE WHEEL.
No. 431,334. Patented July 1, 1890.
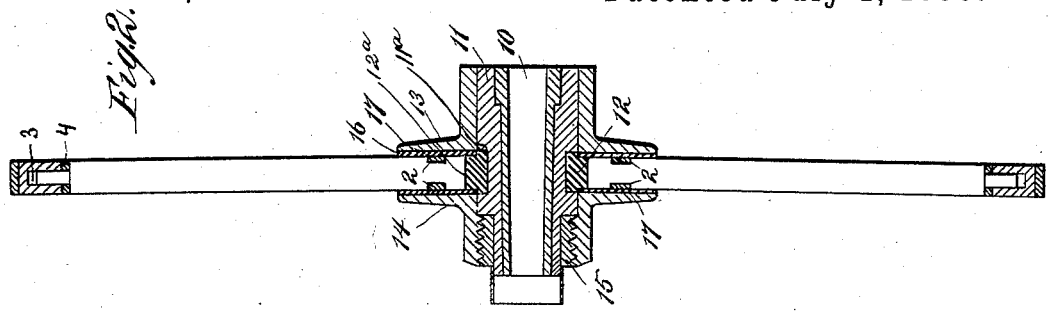
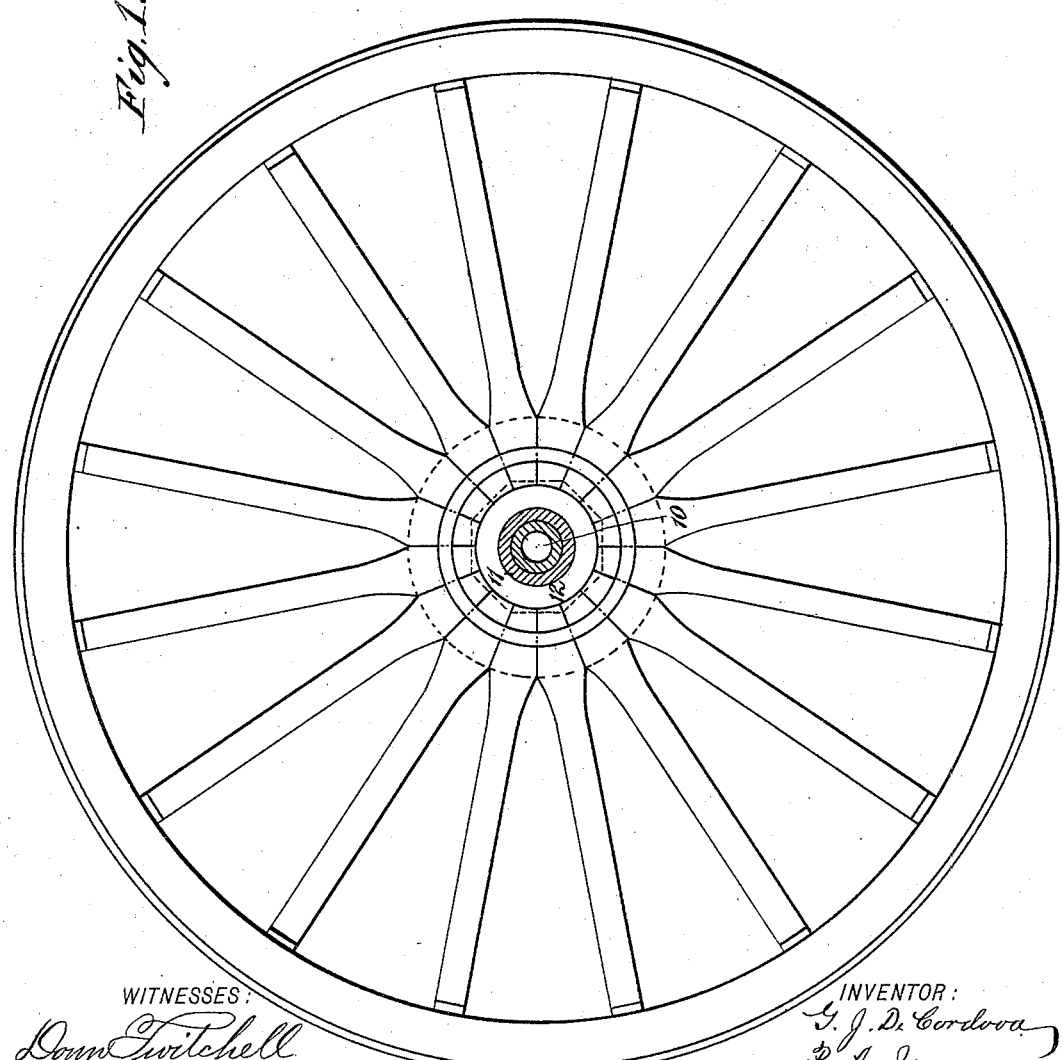
WITNESSES:
Donn Twitchell
C. Sedgwick
INVENTOR:
G. J. D. Cordova
P. A. Isaacs
BY Munn & Co.
ATTORNEYS.

UNITED STATES PATENT OFFICE.

GABRIEL JOSHUA DE CORDOVA AND PERCY ALBERT ISAACS, OF KINGSTON, JAMAICA, WEST INDIES.

VEHICLE-WHEEL.

SPECIFICATION forming part of Letters Patent No. 431,334, dated July 1, 1890.

Application filed September 11, 1889. Serial No. 323,665. (No model.)

*To all whom it may concern:*

Be it known that we, GABRIEL JOSHUA DE CORDOVA and PERCY ALBERT ISAACS, both of Kingston, Jamaica, West Indies, have invented a new and Improved Wheel, of which the following is a full, clear, and exact description.

This invention relates to vehicle-wheels; and it has for its object to prevent jar and noise when traveling, to decrease the wear and tear upon the vehicle, to provide for the ready repair of the wheel, and to so construct the wheel that the tire will at all times be tight.

To this end our invention consists in certain novel features of construction and peculiar combination of parts, all of which will be hereinafter fully described in the annexed specification, and particularly pointed out in the claims, reference being had to the accompanying drawings, in which—

Figure 1 is a side view of a wheel embodying our invention, parts being shown in section; and Fig. 2 is a cross-sectional view of the wheel.

Referring to the drawings, 10 represents the box or thimble, which is arranged within a wooden nave 11 in the ordinary manner. Centrally of the nave 11 we form an annular recess $11^a$, in which is seated a rubber band 12, the upper portion $12^a$ of which projects beyond the nave 11 and forms an abutment for the inner ends of the spokes, said spokes being preferably cut to the form shown in the drawings, their inner ends bearing against the rubber band 12.

To prevent lateral movement of the spokes we provide a flange 13, which is driven upon the rear end of the nave 11, the forward face of the flange being substantially flush with the rear edge of the band 12. In connection with the flange 13 we employ another flange 14, the hub or sleeve of which is internally threaded at $14^a$ to engage an externally-threaded washer 15, secured to the forward end of the nave.

Between the side faces of the spokes and the flanges 13 and 14 we place rubber washers 16, the lower ends of which bear against the upper or projecting portion $12^a$ of the elastic band 12. By this construction and by seating the band 12 in a recess $11^a$ in the nave it will be seen that lateral spread or displacement of said band is entirely prevented, even should some of the parts become loosened by wear. It will also be seen that by compressing the upper portion of the band by means of a tight adjustment of the washers 16 and flanges 13 and 14 said band is pressed radially outward, thereby always presenting a strong cushion for the abutting ends of the spokes.

To serve as an additional means of securing said spokes in proper alignment we provide their outer lower faces with coincident recesses, which form a continuous annular recess $17^a$, in which are fitted metallic rings 17, said rings being held in position by the rubber washers 16.

From the foregoing construction it will be observed that the spokes rest upon an elastic center, and as they are held under continual pressure it follows that any expansion of the tire due to heat or any contraction of the felly due to shrinkage will be compensated for by the outward movement of the spokes, such movement being caused by the elastic base.

Although not positively essential, we prefer to place rubber cushions between the outer ends of the spokes, either at the points marked 3 or at the points marked 4 in Fig. 2.

Having thus described our invention, what we claim as new, and desire to secure by Letters Patent, is—

1. In a wheel, the combination of a nave provided with an annular recess $11^a$, an elastic band held therein and projected beyond said recess, spokes which rest upon said band, and the flanges 13 and 14 for holding said spokes from lateral displacement, substantially as shown and described.

2. The herein-described improvement in vehicle-wheels, consisting of a nave provided with an annular recess $11^a$, an elastic band fitted in said recess, having a portion $12^a$ projected beyond said nave, spokes resting upon said projecting portion, provided with coincident recesses in their lower outer faces, metal rings fitted in said recesses in said spokes, flanges 13 and 14, adjusted on said nave, and elastic washers 16, disposed between the outer lower faces of the spokes and the flanges 13 and 14, the lower edges of said washers pressed by said flanges against the projecting portion of said elastic band 12, whereby said portion is compressed radially outward, substantially as and for the purpose described.

GABRIEL JOSHUA DE CORDOVA.
PERCY ALBERT ISAACS.

Witnesses for G. J. de Cordova:
EDWARD KENT, Jr.,
C. SEDGWICK.

Witnesses for Percy A. Isaacs:
CHAS. E. BARRAN,
J. R. DE CORDOVA.